United States Patent [19]

Beasley

[11] Patent Number: 5,018,770

[45] Date of Patent: May 28, 1991

[54] FIRE SPRINKLER APPARATUS

[76] Inventor: Ronald L. Beasley, Rte. 2, Box 202A - Hooper Rd., Ringgold, Ga. 30736

[21] Appl. No.: 477,643

[22] Filed: Feb. 9, 1990

[51] Int. Cl.[5] .......... F16L 55/00

[52] U.S. Cl. .......... 285/39; 285/2; 285/3; 285/318; 285/308; 81/463; 239/579; 137/68.1; 251/321

[58] Field of Search .......... 285/2, 3, 39, 318; 30/360, 361, 362, 367; 222/83, 89; 137/68.1; 251/76, 321; 81/463; 239/309, 579

[56] References Cited

U.S. PATENT DOCUMENTS

| | | | |
|---|---|---|---|
| 2,114,583 | 3/1936 | Adams | 222/83 |
| 2,446,848 | 11/1946 | Prester | 30/367 |
| 3,791,034 | 2/1974 | Carver | 30/367 |
| 3,844,585 | 10/1974 | Sanas et al. | 285/3 |
| 3,938,704 | 2/1976 | Milgram | 137/68.1 |
| 4,475,670 | 10/1984 | Rutter | 222/83 |

*Primary Examiner*—Peter M. Cuomo
*Assistant Examiner*—Tim Aberle
*Attorney, Agent, or Firm*—Alan Ruderman

[57] ABSTRACT

A coupling having one end attached to a drop pipe of a fire sprinkler system and another end for attachment to a tool subsequent to initially testing the sprinkler system and to a sprinkler head thereafter. The coupling includes an internal frangible closure member to prevent flow of fluid from the drop pipe during the test phase so that the sprinkler may be pre-tested prior to attachment of the sprinkler head. The tool includes an external housing which after completion of the test phase is connected to the coupling, a ram being mounted within the housing and adjustable to position and impact member at the end of the ram at or in abutment with the frangible closure member. The ram is connected to a propelling assembly which permits the ram to be pulled manually against the biasing force of a spring away from the closure member, and upon release of the ram, the ram is propelled toward the closure member so that the impact member shatters the closure member to open communication through the coupling. The tool is thereafter disconnected and a sprinkler substituted.

19 Claims, 1 Drawing Sheet

FIRE SPRINKLER APPARATUS

BACKGROUND OF THE INVENTION

This invention relates to fire sprinkler apparatus and more particularly to the combination of a reducer having a frangible seal used during initial testing of the apparatus and a tool for insertion into the coupling for forcibly shattering the seal after completion of the testing so that a sprinkler head may be operatively connected to the coupling.

In fire sprinkler systems used in commercial buildings, office buildings, industrial buildings, warehouses and the like, a main water supply pipe is disposed above the ceilings in such buildings, the main pipe having a plurality of drop pipes connected thereto by means of respective tee joint coupling. Conventionally, the drop pipe initially extends below the ceiling and has a coupling at the end thereof, the coupling having a conventional pipe plug inserted therein to prevent water from flowing out the coupling during the initial testing of the system. During the initial testing phase water is supplied to the main pipe and pressure and flow checks are made prior to installation of the sprinkler heads. After the testing phase the drop pipe must be cut so that the coupling can be disposed at the ceiling level and the sprinkler heads attached thereto. This first requires removal of the plug to permit the water that has accumulated in the vertical drop pipe to be drained. A measurement must then be made to determine the distance from the ceiling to the bottom of the coupling. The drop pipe is then disconnected from the tee coupling and shortened by cutting off the upper end of the drop pipe by the amount of the previously made dimension. The cut portion of the pipe must then be rethreaded and connected back into the tee coupling so that the coupling is substantially at the elevation of the ceiling. The sprinkler head is thereafter attached to the coupling.

Not only is this procedure time consuming, and thus costly, especially where there are a substantial number of such drop pipes, since each pipe must be rethreaded and doped and, additionally each plug must be doped prior to initial insertion into the coupling. Furthermore, a number of other problems may result. For example, if a plug swells it may be difficult to remove from the coupling prior to disconnection of the drop pipe and, since conventional plugs have square heads, if the edges of the head become "stripped" it may be necessary to remove the coupling from the drop pipe and replace it with a new coupling prior to making the measurement from the ceiling. Another problem occasionally results when plugs are not readily available when the test is to be made. In these instances delays result or if a sprinkler head is utilized in place of a plug during the testing phase, subsequent use of the head may result in leakage. Another inconvenience which occurs with the prior art system is that since the length of the drop pipe is substantial, when the plug is removed from the coupling, or the coupling is removed from the pipe in those instances where the plugs may have swelled, a substantial amount of water may drain, and this may cause obvious problems where the sprinkler system is being retrofit into existing buildings.

SUMMARY OF THE INVENTION

Consequently, it is a primary object of the present invention to provide fire sprinkler apparatus having a coupling connected to the vertical drop pipe extending from the main water line, the coupling having an internal flow preventing seal permitting the coupling to be disposed at its final elevation during initial testing of the system, and a tool utilized in conjunction with the coupling for breaking the seal after testing permit attachment of the sprinkler head to the coupling.

It is another object of the present invention to provide a coupling having one end attached to a drop pipe extending from a fire sprinkler main water line and having a frangible internal closure member permitting the sprinkler system to be initially tested without the use of a separate plug, the coupling having structure to which a tool may be attached for shattering the closure member subsequent to the testing and which may thereafter be disconnected from the coupling to permit a sprinkler head to be attached to the coupling.

It is a further object of the present invention to provide in a fire sprinkler apparatus the combination of a coupling having a frangible closure member used during the testing of the apparatus, and a tool connectable to the coupling, the tool having an internal ram which may be forcibly urged into shattering engagement with the closure member to break the closure member after the closure member has served its purpose during the testing of the system so that a sprinkler head may thereafter be connected to the coupling.

Accordingly, the present invention provides a coupling having one end attachable to a drop pipe of a fire sprinkler system and having an opposite end open for attachment to a tool or to a sprinkler head selectively. The coupling includes an internal frangible closure member to prevent flow of fluid from the drop pipe during a testing phase so that the sprinkler system may be pre-tested prior to attachment of the sprinkler heads. The tool includes an external housing which after completion of the testing phase is connected to the coupling. A ram is mounted within the tool housing and may be adjustable to dispose an impact or percussion member at the end thereof in juxtaposition with the frangible closure member. The ram is connected to a propelling assembly which permits the ram to be pulled manually against a biasing force away from the closure member, and upon manual release of the ram, the ram is propelled toward the closure member so that the impact member shatters the closure member to open communication between the drop pipe and the remote end of the coupling when the tool has been disconnected therefrom. A sprinkler head may thereafter be attached in place of the tool.

Since the drop pipe need not be removed from the main water pipe, and a temporary plug is made unnecessary by the present invention, the drop pipe together with the coupling may be permanently attached to the main water line and disposed at the level of the ceiling, which is the desired disposition of the sprinkler head. Consequently, the invention makes it unnecessary to remove a plug from the coupling, measure the distance from the bottom of the coupling to the ceiling, remove the drop pipe from the main water pipe, cut the drop pipe, rethread the cut portion of the drop pipe, and reattach the drop pipe to the main water pipe. This not only reduces the amount of time and cost required to install and test a fire sprinkler apparatus, but also overcomes the aforesaid difficulties.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
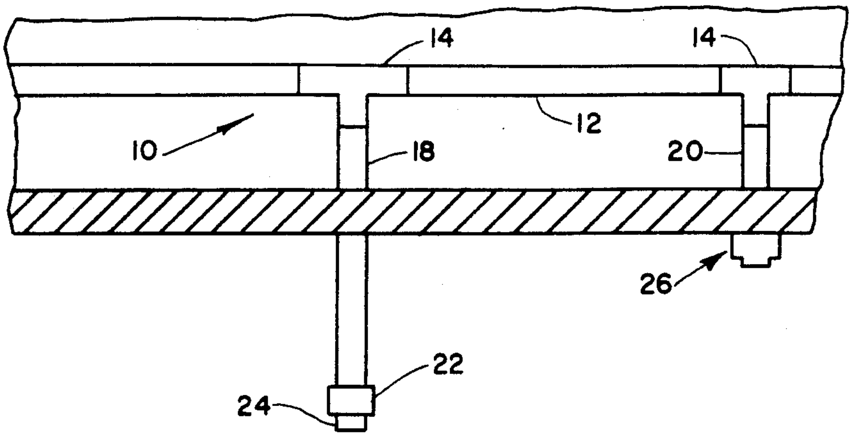
FIG. 1 is a diagrammatic view of a portion of a sprinkler system mounted in a ceiling above a room depicting both a conventional plug-type coupling and a coupling constructed in accordance with the principles of the present invention in the test phase mode.

Referring now to the drawings, FIG. 1 illustrates a portion of a fire sprinkler system 10 including a main water carrying pipe 12 having a plurality of tee-connectors 14 mounted in communication therewith above the ceiling 16 of a building or the like, only two such tee-connectors being illustrated. Drop pipes 18 and 20 are connected to the respective tee-connectors and extend downwardly through the ceiling 16. Conventionally, as illustrated in regard to the drop pipe 18, after installation and during the initial testing phase of the system the drop pipe extends substantially below the ceiling level and has a conventional coupling 22 mounted on the end thereof. The coupling 22 is eventually used to mount a conventional sprinkler head after the testing phase has been completed. However, during the testing phase in order to prevent water from flowing into the room, a plug 24 is threaded into the coupling 22, and after the testing phase is completed the plug is removed to permit the water that has accumulated in the drop pipe 18 to be drained. A measurement is then made from the bottom surface of the ceiling to the bottom surface of the coupling 22. The drop pipe 18 is then disconnected from the tee-coupling 14 and shortened by cutting off an amount as determined by the aforesaid measurement from the top of the drop pipe. The cut portion of the drop pipe connected to the coupling 22 must thereafter be rethreaded and connected back into the tee-coupling 14. As aforesaid, this is a time consuming process and has a substantial number of other disadvantages. Accordingly, the present invention provides a coupling 26 which may be mounted in its final position adjacent the ceiling 16 for receiving the sprinkler head prior to the testing phase so that the drop pipe 20 need not be cut subsequent to the testing phase.

Figure 2:
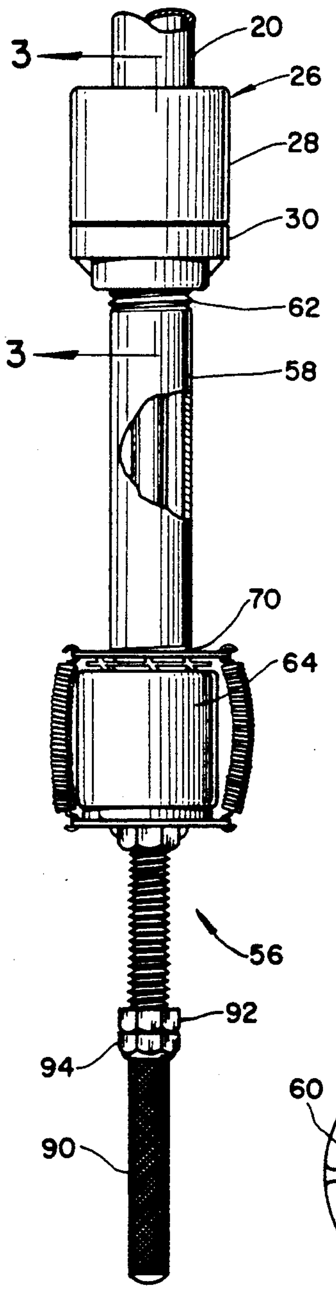
FIG. 2 is an elevational view partly broken away and sectioned illustrating a coupling according to the present invention attached to a tool constructed in accordance with the principles of the present invention for shattering the closure member within the coupling subsequent to the testing phase.
Figure 3:
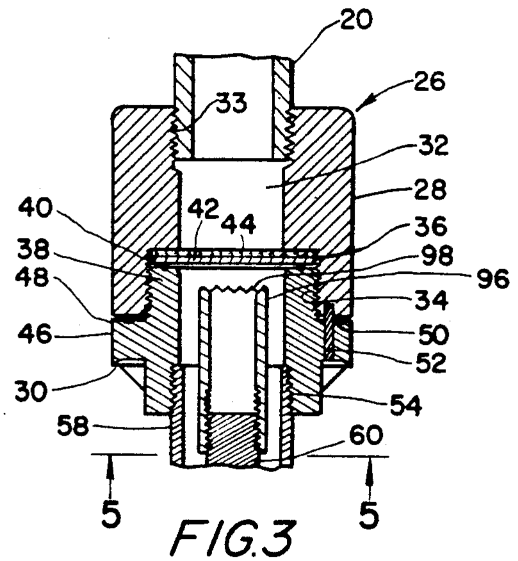
FIG. 3 is an enlarged vertical cross sectional view taken substantially along line 3—3 of FIG. 2.
Figure 4:
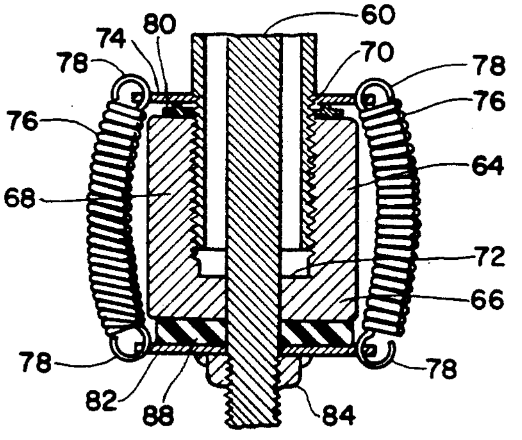
FIG. 4 is an enlarged fragmentary vertical cross sectional view taken through a portion of the tool illustrated in FIG. 2.
Figure 5:
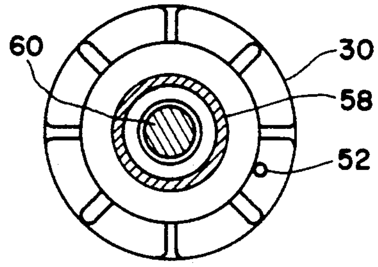
FIG. 5 is a horizontal cross sectional view taken substantially along line 5—5 of FIG. 3.

As illustrated in FIGS. 2 and 3 the coupling 26 comprises first and second body interconnectible parts 28, 30 preferably constructed from malleable iron or the like and cast into an annular configuration. The first or upper body 28 preferably has a cylindrical external configuration so that it may be grasped by means of a wrench or the like for attachment to the drop pipe 20, the body 28 having a central passageway 32 in flow communication with the drop pipe 20, to which it is threadily attached by means of internal threads 33, and thus to the water flowing through the main water pipe 12. Internally formed at the end of the body 28 remote from the drop pipe receiving end is an enlarged bore 34 which extends partly into the body 28 to form an annular ledge or seat 36, the internal wall of the bore 34 being threaded for receiving a cooperating externally threaded hollow cylindrical portion 38 of the second or lower body 30. The length of the cylindrical portion 38 of the body 30 relative to the internally threaded bore 34 of the body 28 is such that when the lower body 30 is fully threaded into the upper body 28 a small space is provided between the internal end of the lower body 30 and the ledge 36.

Disposed on an "O" ring 40 positioned within a groove at the internal end of the lower body 30 when the body parts 28, 30 are assembled is a frangible disk 42 preferably constructed from glass or a plastic material which may act as a closure member against the pressure of the water in the passageway 32 during the test phase. A small disk-shaped pad 44 formed from a readily compressible material, such as felt, is disposed between the frangible disk 42 and the ledge 36 so that the frangible disk is sandwiched between the "O" ring and the pad 44 to prevent premature crushing of the frangible material during assembly and shipment of the coupling. Extending from the cylindrical portion 38 of the lower body 30 is a larger cylindrical section 46 having an upper surface forming an annular flange 48 disposed for abutting the adjacent end of the upper body 28 with another "O" ring 50 disposed therebetween in an annular groove at the flange section 48 so as to provide a seal after the frangible disk 42 has been shattered as hereinafter described. A lock pin 52 may be inserted through a small bore extending longitudinally through the cylindrical section 46 and into the upper body 28 so as to lock the upper and lower body members 28, 30 together after assembly thereof. Formed internally into the lower body 30 at the end remote from the attachment with the upper body 28 are threads 54 for threadedly receiving the sprinkler head and the end of a tool 56 utilized for fracturing or shattering the frangible disk 42 and puncturing the pad 44 as hereinafter described.

The tool 56 comprises an elongated hollow cylindrical housing 58 in the form of a pipe or the like within which a ram 60 in the form of an elongated rod is actually disposed for rotational and axial movement relative to the housing 58. The exterior surface of the housing 58 at one end thereof has an outside diameter adapted to be received within the passageway of the body part 30 and is externally threaded at 62 for cooperative attachment with the internal threads 54 of the passageway. The other end of the housing 58 is received within a cup-shaped guide member 64 having a base portion 66 and an annular wall 68 of substantially the same internal diameter as the external diameter of the housing 58, the housing 58 having external threads 70 cooperatively connected to internal threads within the wall 68 of the guide member 64. A bore 72 is formed through the axis of the base portion 66 for receiving the ram 60, the diameter of the bore 72 being substantially equal to the diameter of the ram so that minimal lateral play results to permit the ram to be axially aligned within the housing 58.

Disposed about the housing 58 adjacent to its attachment with the guide member 64 is a support ring 74 which is positioned about the housing 58 prior to the housing being threadedly connected to the guide member 64. The ring 74 preferably has a larger external diameter than that of the guide member 64 so that its periphery projects beyond the periphery of the guide member. At least two coil springs 76 having hooks 78 at each end thereof are secured to the ring 74 preferably outwardly of the outer periphery of the wall 68 of the guide member by means of the upper hooks passing through respective holes in the ring 74. A small retaining nut 80 secured to the threads 70 externally of the guide member may act to space the ring 74 from the guide member and to lock the ring in position during assembly of the guide member 64 to the housing 58. The lower hooks 78 of the springs 76 are secured to another ring 82 disposed about the ram 60 and spaced below the base member 66 of the guide member 64, the attachment of the lower spring hooks to the ring 82 preferably also being outwardly of the periphery of the wall 68 of the guide member. Fixed to or formed unitary with the ring 82 on the face remote from the guide member 64 is a central locking hub 84, the ring 82 and hub 84 having a coaxial bore extending therethrough while the bore of the hub 84 is threaded to cooperate with threads 86 on the lower end of the ram 60. An impact cushion in the form of an elastomeric pad 88 preferably is disposed about the ram 60 intermediate the base 66 of the guide member 64 and the ring 82 and acts as a shock absorber when the ram is propelled upwardly as hereinafter described, the pad also operating as a stop for the ring 82 during assembly of the tool. After assembly of the locking hub 84 onto the ram 60, a handle 90, preferably knurled, is threadedly secured to the lower end of the ram 60 by means of lock nuts 92, 94, the nut 94 being fixed to the handle 90.

Although the upper end of the ram 60, i.e., the end remote from the handle 90 may itself act as an impact or percussion member, it is preferred that a separate and hollow impact member 96 be threadedly attached to the upper end of the ram, the member 96 having serrations or teeth 98 disposed about the periphery of the end of the impact member remote from the ram 60 so that it may not only shatter the frangible disk 42 but also puncture an opening through the pad 44. Of course, rather than the separate impact member 96, the face of the upper end of the ram may have serrations which act for the same purposes as the teeth of the impact member.

In operation, after the test phase of the sprinkler system has been completed, the tool 56 is disposed such that the upper end of the housing 58 may be received within the lower end of the passageway of the body part 30 and threadedly connected by means of the cooperating threads 54, 62. The handle 90 is thereafter rotated to rotatably move the ram 60 upwardly relatively to the ring 82 and its threaded hub 84 and relative to the housing 58 until the teeth 98 of the impact member 96 abut the disk 42. This may be readily felt through the handle since further rotation will be difficult and the springs 76 will tend to stretch. The handle 90 is thereafter pulled downwardly which pulls the ram 60 and the ring 82 with it to thereby stretch and energize the spring 76. Subsequent release of the handle results in the springs propelling the ram upwardly to forcibly drive the teeth of the impact member 96 into shattering engagement with the disk 42 and through the pad 44, the elastomeric pad 88 acting to absorb the force of the impact between the guide member 64 and the ring 82. The small quantity of water in the pipe 20, which is shorter than the conventional drop pipes 18 utilized during the testing phase, will be released into the hollow of the impact member 96 and the passageway between the housing 58 and the ram 60 and accumulate in the guide member 66. Once the disk 42 has been fractured and the pad 44 punctured, the tool 56 may be removed from the body part 30 of the coupling 26, the water may be dumped and the tool may be subsequently utilized in conjunction with other couplings in the sprinkler system.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. The combination of a coupling for connecting a drop pipe in a fire sprinkler system to a sprinkler head, and a tool for cooperating with the coupling after the system has been tested but prior to connecting said sprinkler head, said coupling comprising a first body member adapted for connection to said pipe, said body member having a first passageway for communicating with said pipe when said body member is connected thereto, a second body member adapted for connection to said head, said second body member having a second passageway including an inlet adapted to communicate with said first passageway when said body members are connected together and an outlet so that fluid entering said first passageway may exit said outlet, a frangible disk, means for connecting said first and second body members together with said disk disposed intermediate said first passageway and said inlet of said second passageway to close communication therebetween until said disk is fractured, first connecting means disposed within said outlet for connecting said sprinkler head to said second body member after said disk is fractured, said tool comprising a hollow elongated housing having first and second ends, second connecting means associated with said first end receivable within said outlet for selective attachment to said first connecting means to connect said housing to said second body member after testing of said sprinkler system, an elongated ram disposed within said housing, said ram having an impact head at one end and a handle at another end, said impact head being disposed for extending out said first end of said housing and into said second passageway and said handle extending out said second end of said housing, means including a plurality of springs for resiliently connecting said housing to said ram, said springs disposed radially outwardly and externally of said second end of said housing, and means for adjustably positioning said ram such that said impact head is in juxtaposition with said frangible disk when said housing is connected to said second body member, whereby said handle may be pulled relatively to said housing away from said coupling manually to energize said springs and upon release of said handle said springs propel said ram toward said coupling to forcibly drive said impact head into fracturing engagement with said disk.

2. The combination as recited in claim 1, wherein said first body member includes an annular seat disposed about said first passageway for receiving said frangible disk, and said second body member includes an annular face disposed about said inlet for maintaining said frangible disk in said seat when said body members are connected together.

3. The combination as recited in claim 2, including a compressible pad disposed intermediate said seat and said frangible disk.

4. The combination as recited in claim 3, including a resilient ring disposed in said annular face for abutting said frangible disk.

5. The combination as recited in claim 3, wherein said impact head has an end facing said frangible disk when said housing is connected to said second body member, and said end includes serrated elements for fracturing said disk and for penetrating through said pad.

6. The combination as recited in claim 5, wherein said tool includes a guide member fastened to said housing, said guide member having means for guiding said cam for movement in the direction of elongation of said housing toward and away from said frangible member when said first and second body members are connected together.

7. The combination as recited in claim 6, wherein said springs comprise coil springs, first ring means for connecting one end of each coil spring to said housing, second ring means for connecting another end of each coil spring to said ram, said guide member being disposed intermediate said first and second ring means.

8. The combination as recited in claim 7, wherein said guide member has a cup-shaped configuration including a base and an annular wall, said ram extending through said base.

9. The combination as recited in claim 8, including an elastomeric pad disposed intermediate said base and said second ring means.

10. The combination as recited in claim 6, including a resilient ring disposed in said annular face for abutting said frangible disk.

11. The combination as recited in claim 1, wherein said tool includes a guide member fastened to said housing, said guide member having means for guiding said ram for movement in the direction of elongation of said housing toward and away from said frangible member when said first and second body members are connected together.

12. The combination as recited in claim 11, wherein said springs comprise coil springs, first ring means for connecting one end of each coil spring to said housing, second ring means for connecting another end of each coil spring to said ram, said guide member being disposed intermediate said first and second ring means.

13. The combination as recited in claim 12, wherein said guide member has a cup-shaped configuration including a base and an annular wall, said ram extending through said base.

14. The combination as recited in claim 13, including an elastomeric pad disposed intermediate said base and said second ring means.

15. A tool for rupturing a frangible disk within a fluid coupling to open a passageway for fluid flow therethrough, said tool comprising a hollow elongated housing having first and second ends, connecting mean associated with said first end receivable within said coupling and for selectively connecting said tool to said coupling with said first end within said passageway, an elongated ram disposed within said housing, said ram having an impact head at one end and a handle at another end, said impact head being disposed for extending out said first end of said housing and into said passageway and said handle extending out said second end of said housing, means including a plurality of springs for resiliently connecting said housing to said ram, said springs disposed radially outwardly and externally of said second end of said housing and means for adjustably positioning said ram such that said impact head is in juxtaposition with said frangible disk when said housing is connected to said coupling, whereby said handle may be pulled relatively to said housing away from said coupling manually to energize said springs and nonrelease of said handle said springs propel said ram toward said coupling to forcibly drive said impact head into fracturing engagement with said disk.

16. A tool as recited in claim 15, wherein said tool includes a guide member fastened to said housing, said guide member having means for guiding said ram for movement in the direction of elongation of said housing toward and away from said frangible member.

17. A tool as recited in claim 16, wherein said springs comprise coil springs, first ring means for connecting one end of each coil spring to said housing, second ring means for connecting another end of each coil spring to said ram, said guide member being disposed intermediate said first and second ring means.

18. A tool as recited in claim 17, wherein said guide member has a cup-shaped configuration including a base and an annular wall, said ram extending through said base.

19. A tool as recited in claim 18, including an elastomeric pad disposed intermediate said base and said second ring means.

* * * * *

UNITED STATES PATENT AND TRADEMARK OFFICE

CERTIFICATE OF CORRECTION

PATENT NO. : 5,018,770

DATED : May 28, 1991

INVENTOR(S) : Ronald L. Beasley

It is certified that error appears in the above-identified patent and that said Letters Patent is hereby corrected as shown below:

Claim 15, column 8, line 28, "nonrelease" should be -- upon release --

Signed and Sealed this

Fifteenth Day of September, 1992

*Attest:*

DOUGLAS B. COMER

*Attesting Officer*

*Acting Commissioner of Patents and Trademarks*